United States Patent [19]

Wilson

[11] 4,355,849
[45] Oct. 26, 1982

[54] HYDRAULICALLY OPERATED ANTI-SKID BRAKING SYSTEMS FOR VEHICLES

[75] Inventor: Alexander J. Wilson, Sutton Coldfield, England

[73] Assignee: Lucas Industries Limited, Birmingham, England

[21] Appl. No.: 241,233

[22] Filed: Mar. 6, 1981

Related U.S. Application Data

[63] Continuation of Ser. No. 119,190, Feb. 6, 1980, abandoned.

[30] Foreign Application Priority Data

Feb. 6, 1979 [GB] United Kingdom ............ 7904114

[51] Int. Cl.³ .................................. B60T 8/02
[52] U.S. Cl. .................................. 303/116; 303/10; 303/117
[58] Field of Search ............ 303/116, 117, 119, 10, 303/68–69, 115, 92; 188/181 A

[56] References Cited

U.S. PATENT DOCUMENTS

| 3,661,427 | 5/1972 | Hodge | 303/116 |
| 3,743,363 | 7/1973 | Hodge et al. | 303/116 |
| 3,881,782 | 5/1975 | Skoyles | 303/116 |
| 3,994,534 | 11/1976 | Wilson | 303/10 |

FOREIGN PATENT DOCUMENTS

| 1268932 | 3/1972 | United Kingdom . |
| 1271761 | 4/1972 | United Kingdom . |
| 1338069 | 11/1973 | United Kingdom . |
| 1499101 | 1/1978 | United Kingdom . |
| 2041128 | 9/1980 | United Kingdom ............ 303/116 |

*Primary Examiner*—Douglas C. Butler
*Attorney, Agent, or Firm*—Scrivener, Clarke, Scrivener and Johnson

[57] ABSTRACT

In an anti-skid braking system a brake is applied in response to the pressure of a supply of hydraulic fluid passed through a first variable orifice from a pump rotatable with rotation of a wheel to be braked so that the wheel is automatically prevented from locking. The system incorporates a second variable orifice in combination with a pre-loaded spring against which a shuttle provided with the orifice is adapted to be displaced to reduce the pressure of the supply from the pump.

9 Claims, 3 Drawing Figures

HYDRAULICALLY OPERATED ANTI-SKID BRAKING SYSTEMS FOR VEHICLES

This application is a continuation, of application Ser. No. 119,190, filed Feb. 6, 1980, now abandoned.

This invention relates to hydraulically operated anti-skid braking systems for vehicles of the kind in which at least one brake is adapted to be applied in response to the pressure of a supply of hydraulic fluid passed through a first variable orifice from a pump, which is rotatable with rotation of a wheel to be braked so that the wheel is automatically prevented from locking.

In known braking systems of the kind set forth the size of the variable orifice should reduce with the vehicle speed during normal braking but, during higher wheel decelerations indicative of a skid, the orifice size should remain fixed. This would enable advantage to be taken of a square law flow/pressure drop characteristic of the orifice, so that a 10% increase in wheel slip would result in a 20% reduction of the pressure applied to the brake.

Difficulty has been experienced in achieving this effect and, hitherto, it has been necessary to include a fixed orifice in series with the variable orifice, to produce a varying flow-dependent pressure drop as an analogue of wheel speed. The pressure drop across the fixed orifice is used to vary the size of the variable orifice in opposition to the force in a spring.

Specifically in the braking system disclosed in GB Patent Specification No. 1 268 932, corresponding to U.S. Pat. No. 3,661,427, the variable orifice becomes smaller with reduced speed such that full braking is always available. In this system a further, third, damping orifice is also included to ensure that during higher wheel decelerations, the size of the variable orifice remains fixed.

The system disclosed in GB Specification No. 1 338 069 corresponding to U.S. Pat. No. 3,743,363 is designed to improve performance at low speeds and on surfaces where the co-efficient of friction is low. Since the square law characteristic of the variable orifice does not always produce a sufficient drop in brake pressure, the system incorporates a dump valve which short circuits the variable orifice under conditions of high wheel deceleration.

These known systems also suffer from the practical problem that the spring which determines the position of the variable orifice has to have a non-linear characteristic compatible with that of the fixed orifice. This is extremely difficult to achieve with any degree of accuracy. In consequence the accuracy of control suffers, especially at low pressures.

Also the pump pressure needs to exceed brake pressure by an amount equivalent to the pressure loss at the fixed orifice, which becomes very significant at high speeds, leading to overheating of the operating fluid.

According to our invention an hydraulically-operated anti-skid system of the kind set forth incorporates a second variable orifice in combination with means for providing a fixed pressure drop across the second variable orifice to provide a more linear wheel speed analogue.

Conveniently the pressure drop across the second orifice is maintained substantially at a constant value by the use of a pre-loaded spring which opposes the pressure differential, and the linear wheel speed analogue comprises the displacement of a shuttle in a bore against the load in the spring to vary the size of the first variable orifice.

Preferably movement of the shuttle in the bore is controlled by a damper chamber, and fluid transfer to and from the chamber is controlled by a third variable orifice of which the size is dependent upon the position in a bore of a piston responsive to pressure applied to the brake.

Two embodiments of our invention are illustrated in the accompanying drawings in which.

Figure 1:
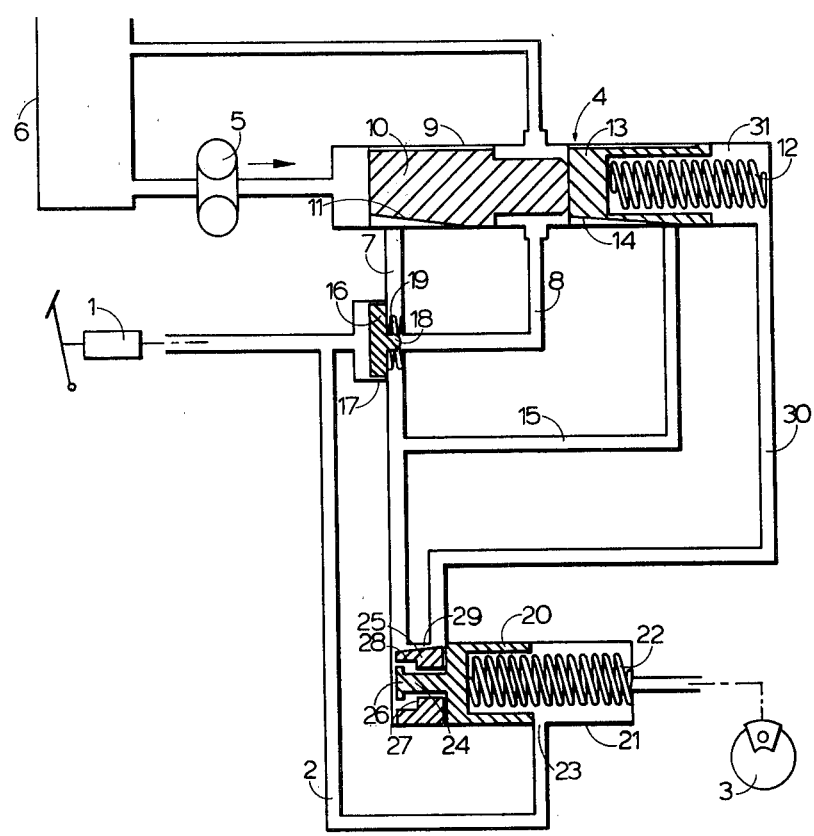
FIG. 1 is a layout of one braking system.

The anti-skid braking systems illustrated in FIG. 1 of the accompanying drawings comprises an hydraulic master cylinder 1 connected to an inlet from which hydraulic fluid under pressure is supplied through a pipe-line 2 to an outlet for connection to a wheel brake 3.

The supply of fluid from the master cylinder 1 to the brake 3 is modulated by an anti-skid control system 4.

The control system 4 comprises an hydraulic pump 5 of high volumetric efficiency which is driven by a wheel to be braked and which draws fluid from a reservoir 6 and pumps it into a delivery line 7. The delivery line 7 is connected at an intermediate point in its length by a return line 8 to the reservoir. A cylinder 9 is connected at one end into the delivery line 7 and a piston 10 working in the cylinder 9 is provided with an inclined flat 11 which constitutes a variable orifice in the delivery line 7 (the second orifice). The pressure drop across the orifice 11 is maintained substantially at a constant low value, suitably 50 p.s.i. (3.4 KN/m$^2$), by means of a pre-loaded spring 12. The spring 12 acts on the piston 10 through a second piston 13 which works in a portion of the cylinder 9 between the piston 10 and the end of the cylinder 9 which is remote from the pump.

The return line 8 traverses the cylinder 9 between adjacent ends of the two pistons 10, 13 so that adjacent ends of the two pistons 10, 13 are in communication with the reservoir 6 and are therefore at atmospheric pressure.

The second piston 13 is also provided with an inclined flat 14 which comprises another variable orifice (the first orifice). The orifice 14 regulates flow between the delivery line 7 at a point on the downstream side of its junction with the return line 8 and the reservoir 6 through a second return line 15 and the space in the cylinder 9 between the two pistons 10, 13.

A piston 16 subjected on one side to pressure in the pipe-line 2 works in a cylinder 17 and a portion 18 of reduced diameter on the opposite side of the piston 16 is normally urged by a spring 19 away from a seating surrounding the end of the return line 8 where it joins the delivery line 7.

A spool 20 works in a cylinder 21 to control the supply of fluid from the master cylinder 1 to the brake 3 through the pipe-line 2. The spool 20 is urged by a spring 22 in a direction to permit flow to the brakes through a port 23 in the wall of the cylinder 21. The opposite end of the spool 20 from the spring 22 carries an extension 24 of reduced diameter which projects through a clearance sleeve 25 slidably arranged in the cylinder 21. The extension 24 carries an enlarged head 26 which is normally spaced from a shoulder 27 in the sleeve 25 between the bore of the sleeve 25 and a counterbore 28. The sleeve 25 is guided to slide in the cylinder 21 and is provided with an inclined flat 29 which acts as another variable orifice (the third orifice) to control communication between the delivery line 7 and a damper line 30 which leads into a damper chamber 31 defined in the cylinder 9 between the piston 13 and the end remote from the piston 10.

In a normal inoperative "brakes-off" condition the piston 16 is urged away from the seating of the junction of the delivery line 7 and the return line 8 by means of the spring 19 so that the pump 5 can draw fluid from the reservoir 6 and pump it back to the reservoir 6 through the orifice 11, the delivery line 7, and the return line 8.

When the brake is to be applied, initially, fluid from the master cylinder 1 is supplied to the brakes 3 through the pipe-line 2 and the cylinder 21. This pressure also acts on the piston 16 to urge it towards the seating against the loading in the spring 19 and restrict flow through the return line 8. The fluid has then to pass to the reservoir 6, through the second return line 15 and the first orifice 14, which has a square law characteristic.

As the piston portion 18 of reduced diameter moves towards the seating to restrict the return line 8, the pressure in the control system 4 rises to a value which is higher than the pressure supplied by the master cylinder 1, due to the differential areas of the piston 16. This higher pressure acts on the spool 20 to move it in a direction against the sum of the load in the spring 22 and the master cylinder pressure applied to the brakes 3. Initially the spool 20 is operative to close the port 23 and cut-off communication between the master cylinder 1 and the brakes 3, and subsequently to increase the pressure of fluid applied to the brakes and which becomes trapped in the cylinder 21.

The braking pressure achieved is determined by the pressure generated in the delivery line 7, this in turn, being determined by the degree to which the entrance to the low pressure return line 8 is restricted by the piston portion 18.

Maximum braking pressure is achieved when the piston portion 18 has completely sealed the entrance to the return line 8 so that the whole of the delivery from the pump 5 is passed through the orifice 14.

During normal driving, including normal braking, the size of the orifice 14 is continuously adjusted in accordance with the varying speed of the road wheel. However, any pressure which is generated is independent of the speed of the wheel which drives the pump braking under condition of low deceleration is achieved only by means of the master cylinder 1 exerting pressure through conduit 2 and cylinder 21, so that changes in the speed at the wheel do not effect the magnitude of any braking pressure.

The size of the orifice 14 is controlled by the axial position of the piston 10. All the fluid from the pump 5 has to pass through the orifice 11, thereby generating a back pressure which acts, in opposition to the spring 12, upon that end face of piston 10 which is remote from the return line 8. Thus the piston 10 tends to move to a position in which the effect of the pressure drop through the orifice 11 is balanced by the load in the spring 12. If the speed of the road wheel increases or decreases, then the size of the orifice 11 will be altered in the same sense by an appropriate movement of the piston 10.

The spring 12 is arranged to have a low stiffness and a normal linear characteristic so that the back pressure across the orifice 11 is maintained at a substantially constant low value, and the displacement of the pistons 10 and 13 (and thus the size of the orifice 14) varies substantially linearly with the speed of the road wheel. Thus the system according to this invention avoids the need for non-standard spring characteristics and minimises unnecessary heating of the fluid.

The distance between the head 26 and the shoulder 27 is chosen such that the sleeve 25 moves in the cylinder 21 with the spool 20 after the spool 20 has closed the port 23. Further movement of the sleeve 25 with the spool 20 increases the effective size of the orifice 29 which increases the rate at which fluid can flow into the damper chamber 31 and therefore controls the rate at which the pistons 10, 13 can follow variations in the wheel speed. During normal braking the pistons 10, 13 should be able to move so that the size of the orifice 14 can accurately follow the deceleration of the wheel to ensure that the selected braking pressure is maintained. However, the pistons 10, 13 should be prevented from following wheel decelerations in excess of a level corresponding to the adhesion coefficient of the surface upon which the wheel is running so that under these conditions the size of the orifice reduces more slowly than the speed of the wheel. This allows advantage to be taken of the square law characteristic of the orifice 14 to reduce the braking pressure rapidly.

As stated above the size of the orifice 29 is dependent upon the position of the sleeve 25 in the cylinder 21 which depends upon the position of the piston 20. This, in turn, reflects the degree of brake application. Hence the degree of damping provided by the damper chamber 31 is dependent upon the coefficient of friction of the surface over which the vehicle is travelling, since this governs the degree of brake application which can be achieved before a skid develops. Hence the necessity of providing a dump valve is reduced.

In the event of failure of the pump 5, the spring 22 will urge the spool 20 in a direction to open the port 23 so that the brakes 3 can again be applied directly from the master cylinder 1, through the pipeline 2. The failure of the pump 5 will be immediately apparent to the operator because of increased pedaltravel.

The effective areas of the piston 16 could be arranged to provide increased or reduced servo assistance or to vary the servo assistance, according to requirements.

Figure 2:
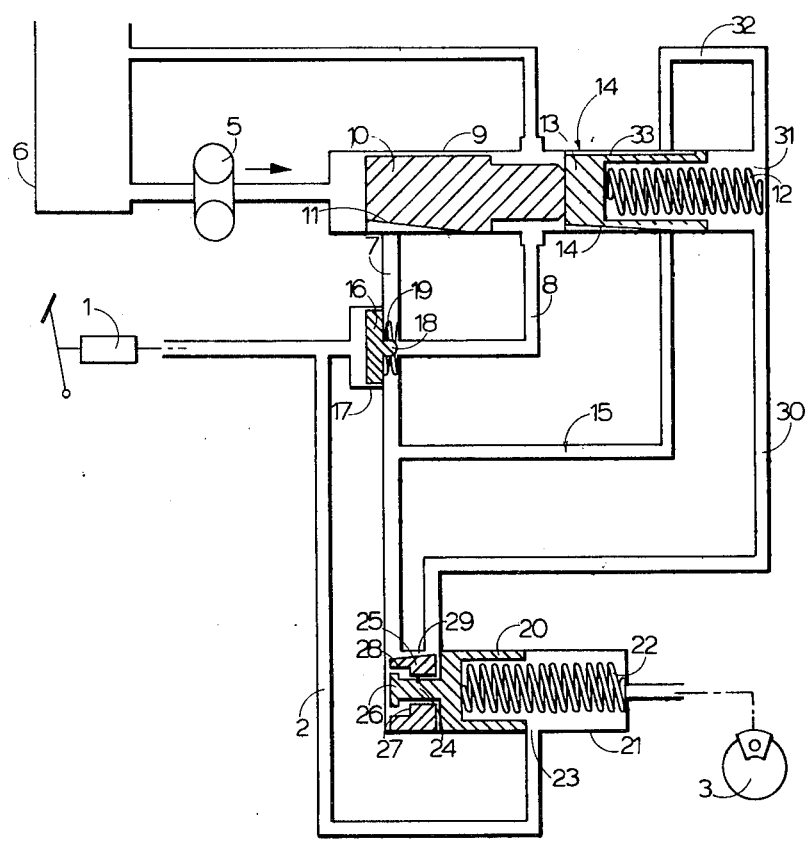
FIG. 2 is a layout of a braking system similar to FIG. 1 but showing a modification.

In the braking system shown in the layout of FIG. 2 a passage 32 connects the damper chamber 31 to an orifice in the form of a parallel-sided slot 33 in the piston 13. The open-end of the slot 33, which is adjacent to the piston 10, is connected to the reservoir 6.

As stated above the restriction 29 controls the rate of flow into the damper chamber 31 to provide varying closure rates for the orifice 14 depending upon the coefficient of friction of the surface over which the vehicle is travelling. However, for very low coefficients of friction the effect of the square law characteristics is again inadequate and it is desirable to reduce the pressure applied to the brakes to a value which is lower than the square law would provide. This can be accomplished by causing the orifice 14 to open further under conditions of such low coefficients of friction. The pressure in the anti-skid control system 4 is then reduced to an artifically low value. This characteristic is achieved by the provision of the orifice 33 which allows fluid in the damper chamber 31 to leak to the reservoir 6. Normally such leakages will be made up by flow through the orifice 29 but, under surface conditions of such low coefficients of friction, the pressure applied to the brakes 3 will be very low also. Hence insufficient fluid will be able to pass through the orifice 29 to compensate for the leakage from the damper chamber 31. The pressure balance across the pistons 10 and 13 will decay, and the pressure from the pump 5 will be sufficient to move the pistons 10 and 13 in a direction to open the orifice 14 further against the load in the spring 12.

The construction and operation of the braking system of FIG. 2 is otherwise the same as that described above with reference to FIG. 1, and corresponding reference numerals have been applied to corresponding parts.

Figure 3:
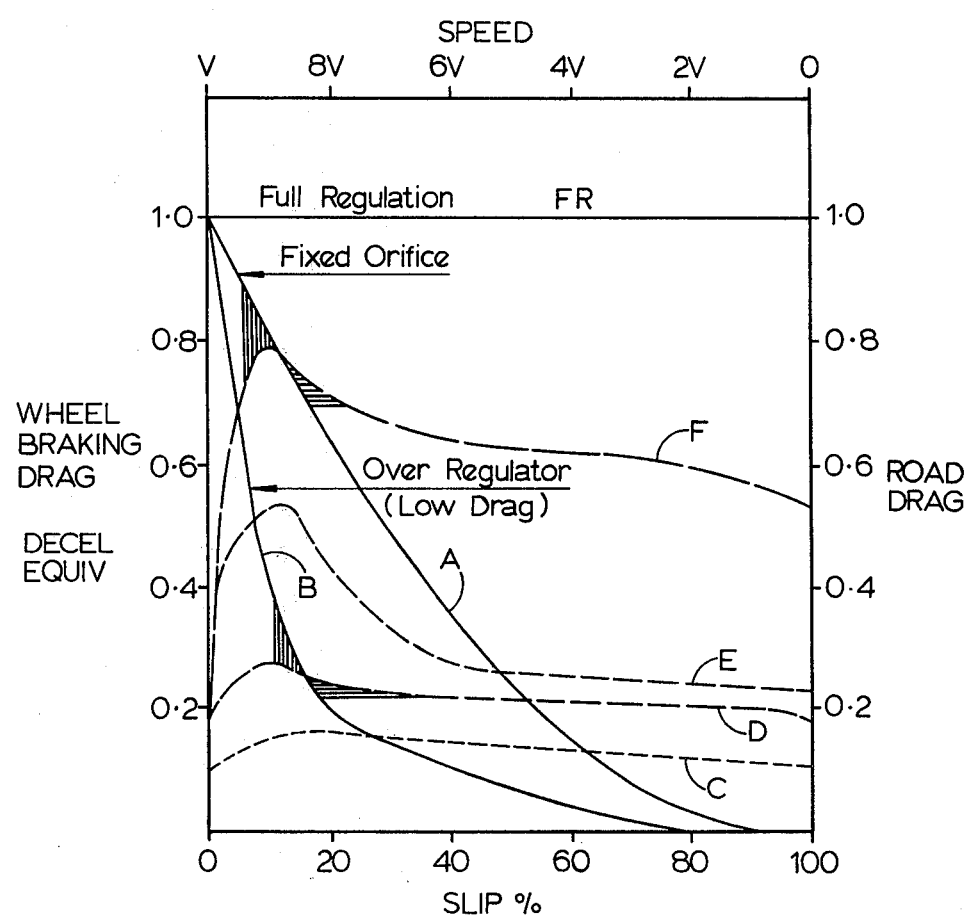
FIG. 3 is a graph providing a comparison between the braking system of the present invention and other known anti-skid braking systems, with respective brake control characteristics and road drag superimposed on one another.

In the graph of FIG. 3 the solid lines A and B show the characteristics of the braking systems described above, and the dotted lines C, D, E and F show the well known curves of % wheel slip against road drag, which is proportional to the coefficients of friction for several different surface conditions.

For a small speed range it is permissible to superimpose curves at SPEED against the WHEEL BRAKING DRAG which corresponds to the hydraulic pressures in this braking system.

If the damper chamber 31 provides no damping at all, then the piston 10 would adjust its position, and hence that of the variable orifice 14, continually during a braking sequence to ensure that full brake pressure was available irrespective of the instantaneous speed of the wheel. This is represented by the line FR (full regulation).

When braking on a surface having a high coefficient of friction with damping provided by the damper chamber 31, the anti-skid control system 4 follows the curve A to correct any skid which may occur. It will be seen that the system optimises braking continually around the coefficient of surface friction/slip curve. Thus if the braking drag exceeds the available road drag, the wheel slows down whilst, as soon as road drag exceeds the braking force, the wheel re-accelerates back to the control point. Hence very precise control is achieved. These characteristics are shown on the graph by areas of vertical shading and by areas of horizontal shading, respectively.

Curve B shows the characteristics of the modified system of FIG. 2 in which the square law curve is modified by the provision of the orifice 33.

From the curves A and B on the graph it will be seen that the problems of control associated with excessive dump, overshoot, and the timing of such functions are avoided by the anti-skid control systems of the present invention.

When the vehicle is stationary the orifices 11, 14 (and the orifice 33 in FIG. 2) are closed, and the pistons 10 and 13 are located in extreme positions into which they urged by the spring 12. When the master cylinder is operated the brakes are applied directly from the master cylinder, through the pipe-line 2 and 3. Since the operation of the master cylinder causes pressure to act on the piston 6 and close the passage 8, any movement of the vehicle which may occur will cause the whole of the resulting delivery from the pump to increase the pressure applied to the brakes.

It will be appreciated that the braking system described above with reference to the layouts of FIGS. 1 and 2 are shown schematically. Thus in a practical system it may be appropriate to incorporate valves of any suitable construction, for example valves of the tipping, centre, or tapered needle type.

Where used herein the term "orifice" is intended to cover any suitable construction having a flow/pressure drop characteristic, and is in no way limited to shape or other constructional features.

I claim:

1. An hydraulically operated anti-skid braking system for a vehicle comprising brake applying means, a reservoir comprising a container for hydraulic fluid, an hydraulic pump rotatable with rotation of said wheel and having an input connected to said reservoir and an output connected to said brake applying means, a leakage path between the output of said pump and said reservoir, a first variable orifice in said leakage path, said brake applying means being responsive to the supply of hydraulic fluid from said pump and passing through said first variable orifice, means for automatically varying the size of said first orifice in response to wheel speed to prevent said wheel from locking upon operation of said brake applying means, second variable orifice means upstream of said brake applying means, and means cooperating with said second variable orifice means to provide a pressure drop of substantially constant value across said second variable orifice means over the range of wheel speeds and consequently a more linear wheel speed analogue of the pressure supplied by said pump to said brake applying means.

2. An anti-skid system as claimed in claim 1 wherein said means cooperating with said second variable orifice means to provide said pressure of substantially constant value comprises a pre-loaded spring.

3. An anti-skid system as claimed in claim 2, including a first piston, and a second separate piston, an inclined flat on said first piston defining said second orifice means, and an inclined flat on said second piston defining said first orifice, wherein said second piston acts on said first piston, said pre-loaded spring acts on said second piston to urge it towards said first piston, and an end of said first piston which is remote from said second piston is exposed to pressure from said pump.

4. An anti-skid system as claimed in claim 3, including a delivery line through which said pump pumps fluid to said brake-applying means, and a return line from said brake-applying means to said reservoir, wherein adjacent ends of said pistons are in communication with said return line.

5. An anti-skid system as claimed in claim 3 comprising a shuttle in a bore, means defining a damper chamber for controlling movement of said shuttle in said bore, a third variable orifice for controlling fluid transfer to and from said damper chamber, and a third bore, wherein the size of the third variable orifice is dependent upon the position of said third piston in said third bore.

6. An anti-skid system as claimed in claim 5, incorporating a fourth orifice and a passage connecting said damper chamber to said fourth orifice, wherein said fourth orifice comprises a parallel-sided slot in said shuttle and of which an end adjacent to said second orifice is connected to said reservoir.

7. An anti-skid braking system as claimed in claim 2 wherein the means for varying said first orifice comprises a shuttle displaceable in a bore in response to the pressure at the output of said pump and against the load in said spring.

8. An anti-skid system as claimed in claim 7 in which the shuttle cooperates with said second variable orifice means to vary the size thereof for providing said linear wheel speed analogue, said shuttle being constructed and arranged that displacement thereof against the load in said spring also effects variation in the size of said first variable orifice.

9. An hydraulically operated anti-skid braking system for a vehicle comprising at least one brake on a wheel of the vehicle, an hydraulic pump rotatable with rotation of said wheel, a first variable orifice, brake applying means for applying said brake, said brake applying means being responsive to the pressure of a supply of hydraulic fluid from said pump and which is passed through said first variable orifice to automatically prevent said wheel from locking, second variable orifice means between said pump and said brake applying means, and a preloaded spring cooperating with said second variable orifice means to maintain the pressure drop across the second orifice means substantially at a constant value to provide a more linear wheel speed analogue of the pressure supplied by said pump to said brake applying means.

* * * * *